(12) United States Patent
Yokochi et al.

(10) Patent No.: US 8,313,824 B2
(45) Date of Patent: *Nov. 20, 2012

(54) DECORATIVE MULTILAYER MATERIAL IMPREGNATED WITH RESIN

(75) Inventors: Eiichiro Yokochi, Tokyo (JP); Kenichi Tachihara, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/581,953

(22) PCT Filed: Dec. 17, 2004

(86) PCT No.: PCT/JP2004/018917
§ 371 (c)(1),
(2), (4) Date: Jun. 7, 2006

(87) PCT Pub. No.: WO2005/058597
PCT Pub. Date: Jun. 30, 2005

(65) Prior Publication Data
US 2007/0104928 A1  May 10, 2007

(30) Foreign Application Priority Data
Dec. 18, 2003 (JP) ................................. 2003-420485

(51) Int. Cl.
*B41M 5/00* (2006.01)
(52) U.S. Cl. ...................... 428/195.1; 428/196; 428/197; 428/156; 428/447; 428/423.1; 156/196; 526/279
(58) Field of Classification Search ............... 428/195.1, 428/196, 197, 423.1, 447, 156; 156/196; 526/279
See application file for complete search history.

(56) References Cited

U.S. PATENT DOCUMENTS 4,107,013 A * 8/1978 McGinniss et al. ............ 524/524
4,196,033 A * 4/1980 Arai et al. ...................... 156/196
(Continued)

FOREIGN PATENT DOCUMENTS

CN  1124941 A  6/1996
(Continued)

OTHER PUBLICATIONS

European Search Report dated Mar. 21, 2012; Appln. No. 04 80 7275.5.

*Primary Examiner* — D Lawrence Tarazano
*Assistant Examiner* — Tamra L Dicus
(74) *Attorney, Agent, or Firm* — Ladas & Parry LLP (57) ABSTRACT

A decorative material capable of achieving both surface endurance such as abrasion resistance, and internal endurance such as subsidence resistance, water resistance and oil resistance. The decorative material is produced by laminating an ionizing radiation curing resin coating paper onto a thermosetting resin impregnated paper, and heat pressing for the integration. A surface layer and a base material layer are laminated and integrated on the rear surface thereof. The surface layer has at least a surface resin layer made of a cured material of an ionizing radiation curing resin, a blocking layer for blocking the ooze out of the uncured material of the thermosetting resin, and an impregnated paper layer formed by a paper impregnated with a thermosetting resin and cured, laminated from the surface side. At least the uppermost surface of the base material layer has an impregnated paper layer formed by a paper impregnated with a thermosetting resin and cured.

8 Claims, 3 Drawing Sheets

U.S. PATENT DOCUMENTS

| | | | |
|---|---|---|---|
| 4,339,566 A * | 7/1982 | Rosenkranz et al. | 427/66 |
| 4,927,572 A | 5/1990 | Van der Hoeven | |
| 5,344,704 A | 9/1994 | O'Dell et al. | |
| 5,466,511 A | 11/1995 | O'Dell et al. | |
| 5,665,457 A * | 9/1997 | Sato et al. | 428/195.1 |
| 6,103,352 A * | 8/2000 | Takahashi | 428/195.1 |
| 6,110,316 A * | 8/2000 | Kobayashi et al. | 156/230 |
| 6,162,264 A * | 12/2000 | Miyazaki et al. | 29/623.5 |
| 6,514,624 B2 * | 2/2003 | Takemoto | 428/447 |
| 6,558,799 B2 * | 5/2003 | Takeuchi et al. | 428/423.1 |
| 6,641,926 B1 * | 11/2003 | Malina et al. | 428/524 |
| 6,803,110 B2 * | 10/2004 | Drees et al. | 428/423.7 |
| 6,866,924 B2 * | 3/2005 | Yamaguchi | 428/304.4 |
| 2002/0059762 A1 | 5/2002 | Takeuchi et al. | |
| 2002/0182429 A1 | 12/2002 | Yokochi et al. | |

FOREIGN PATENT DOCUMENTS

| | | | |
|---|---|---|---|
| EP | 1 038 665 A1 | | 9/2000 |
| JP | 26-4540 | | 8/1926 |
| JP | 37-6143 | | 7/1959 |
| JP | 49-31033 | | 8/1974 |
| JP | 49-39166 | | 10/1974 |
| JP | 58-7465 | | 2/1983 |
| JP | 59-1111 | | 1/1984 |
| JP | 59-209862 | | 11/1984 |
| JP | 3-216337 | | 9/1991 |
| JP | 3-218832 | | 9/1991 |
| JP | 5-64104 | | 9/1993 |
| JP | 2856862 | | 11/1998 |
| JP | 2860779 | | 12/1998 |
| JP | 11-207877 | | 8/1999 |
| JP | 2000-238196 A | | 9/2000 |
| JP | 2000-334895 | | 12/2000 |
| JP | 2001-018331 A | | 1/2001 |
| JP | 2002-36446 | * | 2/2002 |
| RU | 2106974 | | 3/1998 |

* cited by examiner

DECORATIVE MULTILAYER MATERIAL IMPREGNATED WITH RESIN

TECHNICAL FIELD

The present invention relates to a decorative material used for a surface decorative material such as a building material, furniture, or the like.

BACKGROUND ART

Conventionally, as the surface decorative materials for a building material, furniture, or the like, there are various configurations. For example, the patent documents 1 and 2 disclose a so-called thermosetting resin decorative sheet. The decorative sheet is produced by printing a pattern on a titanium paper of about 80 to 120 $g/m^2$ metric grammage with a titanium white pigment mixed; impregnating the same with a uncured material (pre-polymer, monomer) of a thermosetting resin such as a melamine resin and a diallyl phthalate resin; superimposing the impregnated paper onto a phenol resin impregnated paper (core paper), a wood plate, or the like to be the substrate; and heat pressing so as to cross link the impregnation resin and laminating and integrating the all layers. Although its abrasion resistance is insufficient, it is advantageous in that the endurance including the wear resistance, the water resistance, the oil resistance and so on is preferable.

Moreover, the patent documents 3 and 4 disclose a decorative material having a layer configuration comprising a thin paper of about 2 to 30 $g/m^2$ grammage, a pattern layer formed by printing, and a surface protection layer prepared by coating and curing a thermosetting resin paint, to be used in a state bonded on a substrate such as a woody plate. There are a so-called urethane coating paper using a two component curing type urethane resin with a polyol as the principal agent and an isocyanate as the curing agent for the thermosetting resin to provide the surface protection layer thereof, a so-called amino alkyd coating paper using an amino alkyd resin as the thermosetting resin to provide the surface protection layer, or the like.

Since this type of the decorative material is poor in terms of the endurance in general including the abrasion resistance, the wear resistance, the water resistance, and the oil resistance compared with the thermosetting resin decorative sheet; and furthermore, its base material layer is a thin film paper, it has a weaker subsidence resistance compared with the thermosetting resin decorative sheet. That is, in the case a blow or an impact load is applied, when the paper or its base is soft, the base is subsided as well. Moreover, particularly in the case of using as a floor material, subsidence is generated by the local load of a caster.

Moreover, the patent documents 5 to 7 disclose a decorative material having a configuration provided with a surface protection layer produced by providing a pattern layer on a paper, coating an ionizing radiation curing resin paint on the pattern layer and curing, so as to be used on a substrate such as a woody plate by bonding. In these cases, a surface protection layer is formed as a coating film produced by coating an ionizing radiation curing resin paint made of a pre-polymer, a monomer, or the like of an unsaturated polyester resin or a (meth)acrylate based, cross linking and curing by directing an ionizing radiation such as an electron beam and an ultraviolet ray; and thus it is referred to as the so-called ionizing radiation curing resin coating paper.

Since the hard ionizing radiation curing resin is used as the surface protection layer in the decorative material, its abrasion resistance is preferable. Moreover, since curing of the coating film can be finished in a short time (about several seconds or less) by directing the ionizing radiation, the productivity is high. In particular, one disclosed in the patent document 7 has spherical α-almina particles added in the surface protection layer, compared with the thermosetting resin decorative sheet, it has an equivalent or higher abrasion resistance, and a higher wear resistance. However, since the base material layer is a thin film paper, similar to the urethane coating paper, it has weak subsidence resistance and caster resistance compared with the thermosetting resin decorative sheet. Moreover, although the water resistance and the oil resistance of the coating film itself are preferable, in the case once water or oil is permeated into the paper from a pin hole of the coating film or the end face of the coated paper, since the paper itself has weak water resistance and oil resistance, the water resistance and the oil resistance as the coated paper as a whole are insufficient.

As the comprehensive evaluation of the decorative materials mentioned above, the ionizing radiation curing resin coating paper is the best in terms of the surface endurance such as the abrasion resistance. Moreover, the thermosetting resin decorative sheet is the best in terms of the internal endurance such as the subsidence resistance, the water resistance and the oil resistance. Therefore, as the one compensating the advantages and the disadvantages of both of them, those comprising first a thermosetting resin decorative sheet as the base material, and an ionizing radiation curing resin coating paper as the surface layer laminated thereon have been proposed as disclosed in the patent documents 8 and 9. However, since the reaction of the thermosetting resin has been finished in the cured thermosetting resin decorative sheet, even in the case the ionizing radiation curing resin coating paper is laminated thereon, a sufficient bonding property cannot be produced. Moreover, the water resistance and the subsidence resistance are lowered at the paper layer having the absorbing property and the weak strength. Then, a configuration has been provided: placing an ionizing radiation curing resin coating paper on the surface of an uncured thermosetting resin decorative sheet with the paper layer side of the coating paper facing to the thermosetting resin decorative sheet side, heating and pressing by a pressing machine so as to cure the thermosetting resin decorative sheet and to simultaneously bond the ionizing radiation curing resin coating paper, furthermore, permeating the thermosetting resin into the fibers of the paper layer so as to reinforce the bonding property of the both layers by the anchoring effect, reinforce the strength of the paper layer, and seal the water absorbing property.

Patent article 1: Japanese Patent Application Publication (JP-B) No. 26-4540
Patent article 2: JP-B No. 37-6143
Patent article 3.: JP-B No. 49-39166
Patent article 4: JP-B No. 59-1111
Patent article 5: JP-B No. 49-31033
Patent article 6: Japanese patent No. 2,856,862
Patent article 7: Japanese patent No. 2,860,779
Patent article 8: JP-B No. 58-7465
Patent article 9: JP-B No. 5-64104

DISCLOSURE OF THE INVENTION

Problem to be Solved by the Invention

As a result of the discussion of the present inventors on the decorative material disclosed in the above-mentioned patent documents 8 and 9, a further problem to be solved has been found out. That is, since the thermosetting resin permeates through the ionizing radiation curing resin coating film so as to ooze out to the surface of the decorative sheet at the time of the heat pressuring process (thermal press), the design appearance is deteriorated as well as the surface endurance provided inherently to the ionizing radiation curing resin coating film is deteriorated.

The present inventors have studied the phenomenon so as to find out that the cause thereof is as follows. The first cause is that minute cracking is generated in the hard and vulnerable ionizing radiation hardening resin coating film at the time of heat pressing so that the uncured material of the uncured (halfway of curing) thermosetting resin (pre-polymer or monomer) comes out through the coating film by passing through the cracking. Moreover, the second cause is that even though the coating film of the ionizing radiation curing resin itself has a high cross linking density so as to have a high blocking property, at the time of actually coating on the paper, minute pin holes are formed in the coating film due to the rough surface coarseness of the paper, the high paper permeating property and the unevenness. As a result, the uncured material of the thermosetting resin comes out through the perforations.

The present invention has been achieved in view of such background. An object of the invention is to obtain a decorative material capable of achieving both: the surface endurance such as the abrasion resistance and the internal endurance such as the subsidence resistance, the water resistance and the oil resistance, aiming at further improvement of the conventional decorative material.

Means for Solving the Problem

A decorative material comprises a surface layer and a base material layer laminated and integrated on the rear surface thereof, characterized in that the surface layer comprises at least a surface resin layer made of a cured material of an ionizing radiation curing resin, a blocking layer for blocking the ooze out of the uncured material of the thermosetting resin, and an impregnated paper layer formed by a paper impregnated with a thermosetting resin and cured, laminated from the surface side; and at least the uppermost surface of the base material layer comprises an impregnated paper layer formed by the paper impregnated with the thermosetting resin and cured.

A decorative material is the decorative material, characterized in that the blocking layer has a form of an impregnated blocking layer impregnated in the inside of the surface side of the paper comprising the impregnated paper layer.

A decorative material is the decorative material, characterized in that a pattern ink layer is provided between the surface resin layer and the impregnated blocking layer.

A decorative material is the decorative material, characterized in that the blocking layer has a form of an independent blocking layer present on the surface side of the impregnated paper layer without being impregnated in the impregnated paper.

A decorative material is the decorative material, characterized in that a pattern ink layer is provided either between the surface resin layer and the independent blocking layer, or between the independent blocking layer and the impregnated paper layer.

A decorative material is the decorative material, characterized in that the blocking layer has both a form of an independent blocking layer present on the impregnated paper surface side without being impregnated in the impregnated paper and a form of an impregnated blocking layer impregnated in the inside of the surface side of the paper comprising the impregnated paper layer.

A decorative material is the decorative material, characterized in that a pattern ink layer is provided either between the surface resin layer and the independent blocking layer, or between the independent blocking layer and the impregnated blocking layer.

A decorative material is the decorative material, characterized in that the blocking layer comprises a cured material of a two component curing type urethane resin.

A decorative material is the decorative material, characterized in that the surface resin layer comprises the cured material of the ionizing radiation curing resin including an alkylene oxide modified polymerizable compound.

A decorative sheet is characterized by comprising the decorative material and a base material to be adhered.

Effect of the Invention

Since the decorative material of the present invention has a thermosetting resin impregnated paper and an ionizing radiation curing resin coating paper laminated and integrated, the advantages of them: the surface endurance such as the abrasion resistance of the ionizing radiation curing resin coating paper and the internal endurance such as the subsidence resistance, the water resistance and the oil resistance of the thermosetting resin decorative sheet, can be achieved so as to compensate the disadvantages.

Moreover, the ooze out of the uncured material of the thermosetting resin, to be generated at the time of integrating the thermosetting resin impregnated paper and the ionizing radiation curing resin coating paper by laminating, and heat pressing, through the ionizing radiation curing resin coating film, can be prevented. Accordingly, the design appearance is not deteriorated and the surface endurance inherent to the ionizing radiation curing resin coating film cannot be deteriorated.

Moreover, according to the decorative material of a type with the blocking layer comprising both a form of the individual blocking layer and a form of an impregnated blocking layer, the effect of preventing the ooze out of the uncured material of the thermosetting resin through the ionizing radiation curing resin coating film can be obtained with further certainty.

EXPLANATION OF REFERENCES

D decorative material
S surface layer

B base material layer
1 impregnated paper layer
2 surface resin layer
3 blocking layer
3a impregnated blocking layer
3b independent blocking layer
4 pattern ink layer
11 paper layer
11' impregnated paper layer
12 impregnated blocking layer
13 pattern ink layer
14 independent blocking layer
15 surface resin layer
16 uncured base material layer

BEST MODE FOR CARRYING OUT THE INVENTION

A decorative material of the present invention is produced by basically laminating an ionizing radiation curing resin coating paper on a thermosetting resin impregnated paper, and heat pressing so as to be integrated. However, at the time, in the layer configuration of the ionizing radiation curing resin coating paper, a blocking layer having the nature of blocking an uncured material (pre-polymer, or a monomer) of a thermosetting resin is disposed between the paper and the ionizing radiation curing resin coating film. Thereby, penetration of the uncured material of the thermosetting resin in the impregnated paper through the ionizing radiation curing resin coating film at the time of the heat pressing process can be prevented. Accordingly, the advantages of the thermosetting resin decorative sheet and the ionizing radiation curing resin coating paper can both be achieved so as to obtain a decorative material having both the excellent surface endurance and internal endurance.

Figure 1:
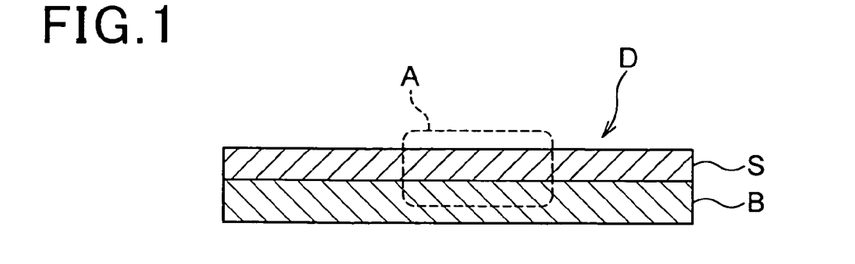
FIG. 1 is a schematic cross-sectional view showing the basic configuration of a decorative material according to the present invention.

FIG. 1 is a schematic cross-sectional view showing the basic configuration of a decorative material according to the present invention. Then, FIGS. 2 to 5 are each enlarged views of the portion shown by A in FIG. 1, showing a representative one of various embodiments. However, the decorative materials of the present invention are not limited only to the embodiments shown in FIGS. 2 to 5.

Figure 2:
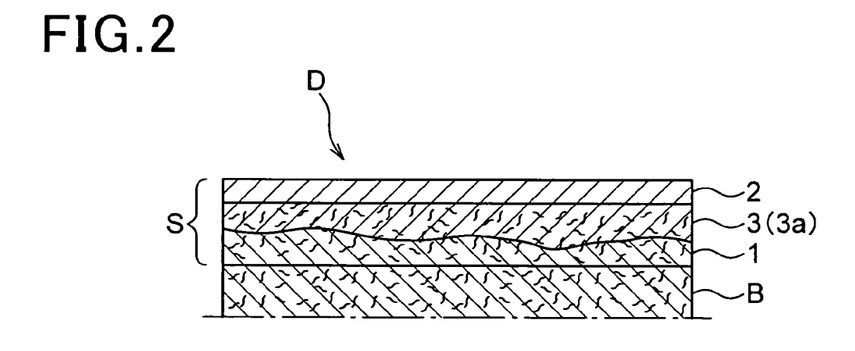
FIG. 2 is an enlarged cross-sectional view showing an example of a decorative material according to the present invention.

As shown in FIG. 1, the basic configuration of the decorative material D according to the present invention comprises a surface layer S and a base material layer B laminated and integrated on the rear surface thereof. Out of them, as shown in FIG. 2, the surface layer S comprises an impregnated paper layer 1 formed by impregnating a paper with a thermosetting resin and curing, a surface resin layer 2 comprising a cured material of an ionizing radiation curing resin formed on the surface thereof, and a blocking layer 3 disposed between the both layers and has the performance of blocking the ooze out of the uncured material of the thermosetting resin comprising the base material layer B to the surface until completing the curing (hereinafter, it will be referred to also simply as the "thermosetting resin ooze out blocking property"). On the other hand, the base material layer B comprises a paper impregnated with a thermosetting resin and cured at least as the uppermost surface thereof.

The decorative material D shown in FIG. 2 is the simplest embodiment of the present invention. In this configuration, the surface layer S comprises a blocking layer 3 for blocking the ooze out of the uncured material of the thermosetting resin comprising the base material layer B to the surface between the surface resin layer 2 and the impregnated paper layer 1. The blocking layer 3 in the decorative material has a form of an impregnated blocking layer 3a with the paper impregnated with the thermosetting resin ooze out blocking property resin.

Figure 3:
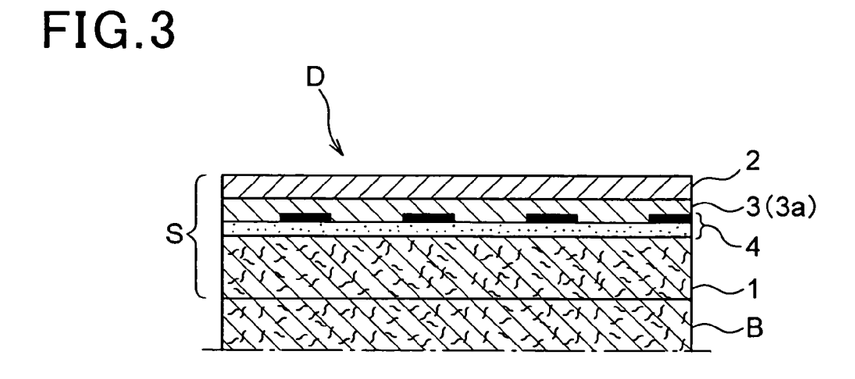
FIG. 3 is an enlarged cross-sectional view showing an example of a decorative material according to the present invention.
Figure 4:
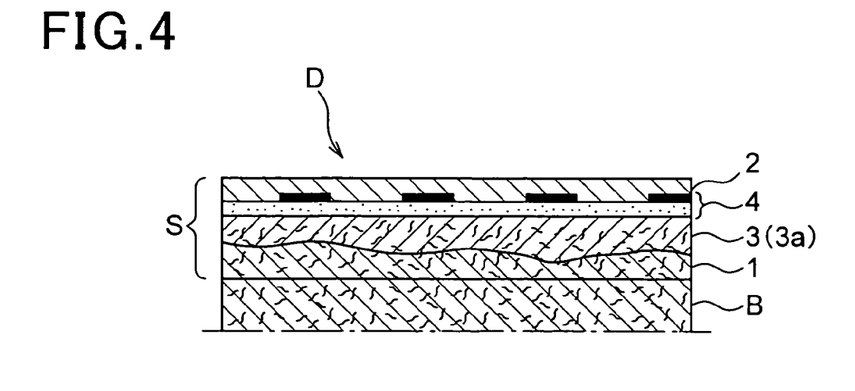
FIG. 4 is an enlarged cross-sectional view showing an example of a decorative material according to the present invention.
Figure 5:
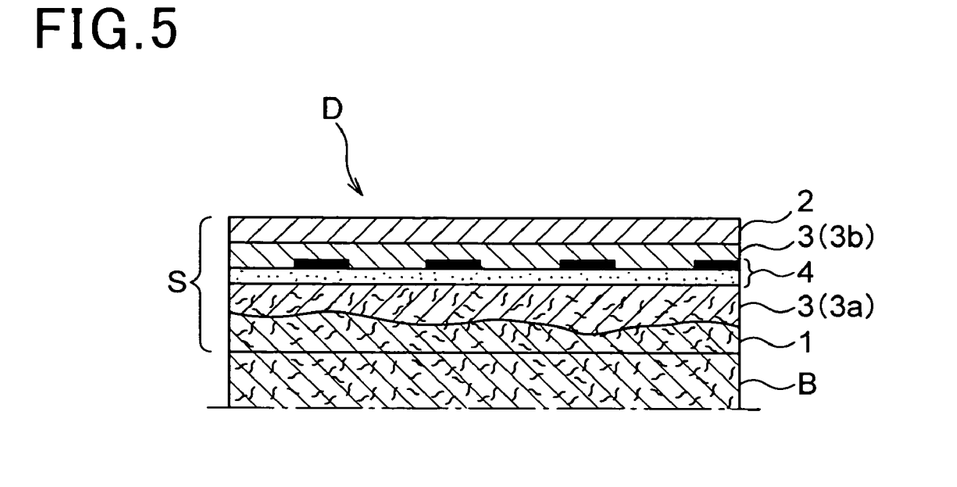
FIG. 5 is an enlarged cross-sectional view showing an example of a decorative material according to the present invention.

The decorative materials shown in FIGS. 3 to 5 respectively has the surface layer S comprising a pattern ink layer 4 between the impregnated paper layer 1 and the surface resin layer 2.

The decorative material D shown in FIG. 3 has the configuration comprising the blocking layer 3 between the surface resin layer 2 and the pattern ink layer 4. The blocking layer 3 in the decorative material has a form of the independent blocking layer 3b comprising only the thermosetting resin ooze out blocking property resin. Moreover, a form comprising a pattern ink layer 4 between the surface resin layer 2 and the independent blocking layer 3b may be adopted as well.

The decorative material D shown in FIG. 4 has a configuration comprising the blocking layer 3 between the impregnated paper layer 1 and the pattern ink layer 4. The blocking layer 3 in the decorative material has a form of an impregnated blocking layer 3a with the paper impregnated with the thermosetting resin ooze out blocking property resin.

The decorative material D shown in FIG. 5 has a form comprising the blocking layer 3 each between the surface resin layer 2 and the pattern ink layer 4, and between the impregnated paper layer 1 and the pattern ink layer 4. The blocking layer 3 between the surface resin layer 2 and the pattern ink layer 4 in the decorative material has a form of an independent blocking layer 3b comprising only the thermosetting resin ooze out blocking property resin; and the blocking layer 3 between the impregnated paper layer 1 and the pattern ink layer 4 has a form of an impregnated blocking layer 3a with the paper impregnated with the thermosetting resin ooze out blocking property resin.

The pattern ink layer is not limited to those shown in FIGS. 3 to 5, and it may be provided between the layers capable of forming the pattern ink layer in the decorative materials of each form, that is; either between the surface resin layer and the independent blocking layer, between the surface resin layer and the impregnated blocking layer, between the independent blocking layer and the impregnated paper layer, or between the independent blocking layer and the impregnated blocking layer.

FIGS. 6A to 6E is a process diagram showing a representative production method for a decorative material according to the present invention. It shows the case of producing the decorative material of the embodiment of FIG. 5 having the largest number of the layer configurations out of the decorative materials shown in FIGS. 2 to 5. As to the production methods for the decorative materials of the other embodiments, they can be known by eliminating the layers to be omitted in the various decorative materials and the production methods therefor from the production method shown in FIGS. 6A to 6E.

Figure 6A:
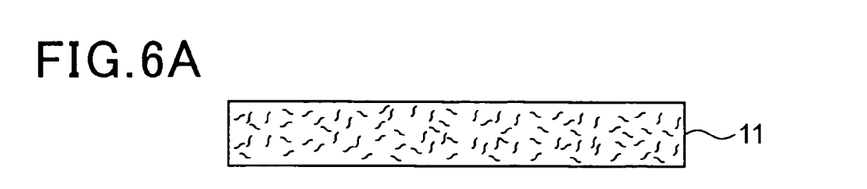
FIGS. 6A to 6E is a process diagram showing a representative production method for a decorative material according to the present invention.

First, as shown in FIG. 6A, a paper not impregnated with a thermosetting resin and without formation of another layer is prepared, and it is provided as a paper layer 11.

Figure 6B:
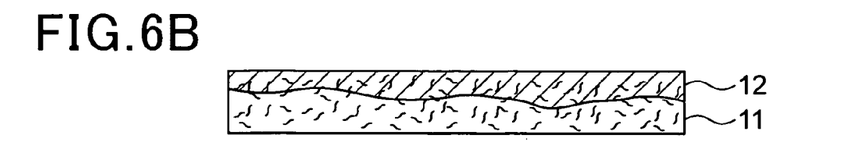
Figure 6C:
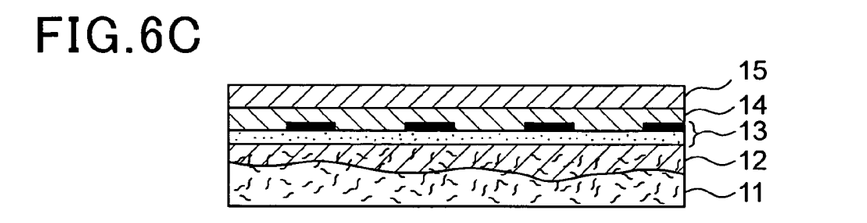

Next, as shown in FIG. 6B, an impregnated blocking layer 12 is formed by impregnating from the surface side of the paper layer 11 with a thermosetting resin ooze out blocking property resin by a known coating method or impregnating method such as roll coating and gravure roll coating. The impregnated blocking layer 12 in the paper layer 11 is in a state with the gap between the fibers of the paper filled-with the impregnating resin. As it is apparent from the figure, the impregnated blocking layer 12 remains without reaching to the rear surface of the paper layer 11. This is because in the case the impregnated blocking layer 12 extends from the front surface of the paper layer 11 to the rear surface, the thermosetting resin in the base material layer B penetrates into the paper layer 11 at the time of the heat pressing process to be described later so as to prevent firm adhesion with the paper fibers by the anchoring effect, and thus it is not preferable. In this specification, the "front surface" denotes the side to be exposed and observed at the time of being used as the decorative material (in each figure, the upward side) Then, as shown in FIG. 6C, a pattern ink layer 13, an independent blocking layer 14, and a surface resin layer 15 are laminated and formed in this order on the front surface of the impregnated blocking layer 12 side of the paper layer 11 by a known printing or coating method. Although the independent blocking layer 14 is provided by coating a thermosetting resin ooze out blocking property resin, since it is not present between the fibers of the paper layer 11 but present as an independent layer, it is referred to accordingly.

Figure 6D:
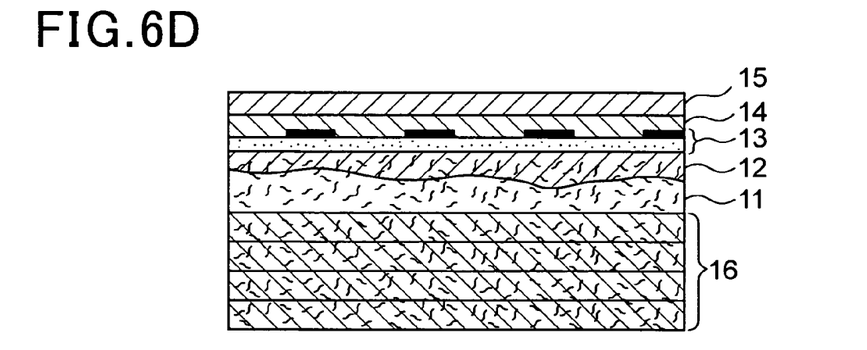

Subsequently, as shown in FIG. 6D, the laminated body of the configuration shown in FIG. 6C is placed on the uncured base material layer 16 with the paper layer 11 side thereof facing the uncured base material layer 16 side. The uncured base material layer 16 comprises, at least on the front surface side, one or more layers of paper layers impregnated with a thermosetting resin of an uncured state (in the figure, the case of four layers is shown). Thereafter, a heat pressing shaping is carried out with a known thermal pressing machine so as to permeate the thermosetting resin in the uncured base material layer 16 into the paper layer 11 as well as the thermosetting resin in the uncured base material layer 16 and the paper layer 11 is cured.

Figure 6E:
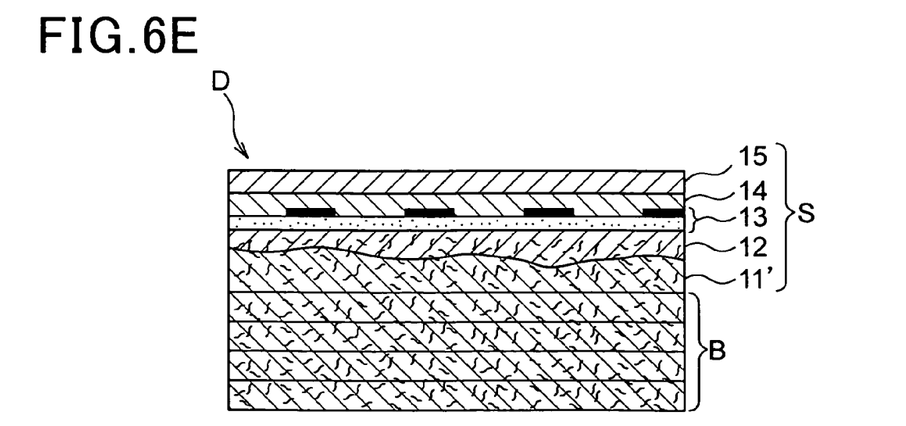

Thereby, as shown in FIG. 6E, the paper layer 11 not impregnated is impregnated with the thermosetting resin permeated form the uncured base material layer 16 and cured so as to provide an impregnated paper layer 11' while also the surface resin layer 15 to the impregnated paper layer 11' provides the surface layer S. Moreover, the uncured base material layer 16 has the uncured thermosetting resin in itself cured so as to provide the base material layer B. Then, the surface layer S and the base material layer B are bonded and integrated firmly by the cured material of the thermosetting resin present over the both layers. By the blocking layer (impregnated blocking layer 12 and the independent blocking layer 14), ooze out of the thermosetting resin of the uncured stage in the uncured base material layer 16 to the surface through the surface resin layer 15 can be prevented at the time of the heat pressing. Accordingly, the decorative material D of the configuration of FIG. 5 can be obtained.

Hereafter, the surface resin layer, the blocking layer, the impregnated paper layer, the pattern ink layer and the base material layer comprising the decorative material of the present invention will be explained independently.

The surface resin layer 2 is the layer to be the uppermost surface of the decorative material, and it is formed as a cured coating film of an ionizing radiation curing resin. It can be cured preferably by the cross linking curing. Owing to the surface resin layer, for its high cross linking property, a decorative material having the excellent surface physical properties such as the wear resistance and the pollution resistance can be obtained. Then, the surface resin layer is formed in general as a colorless transparent layer. The surface resin layer can be formed by coating a liquefied ionizing radiation curing resin (composition) by a known coating method such as gravure coating and roll coating, and cross linking and curing the coating film by the irradiation of an ionizing radiation. The surface resin layer can also be formed by the total solid printing by gravure printing, or the like. The thickness of the surface resin layer is in general about 1 to 30 $g/m^2$ (based on the solid component) in terms of the coating amount.

As the ionizing radiation curing resin, specifically, a composition as an optional mixture of a pre-polymer (including a so-called oligomer) and/or a monomer, having a radically polymerizable unsaturated bond or a cation polymerizable functional group in a molecule (hereinafter they will be also referred to as a "compound" as the general term), to be cross linked and cured by an ionizing radiation capable of being used preferably. Here, the ionizing radiation denotes an electromagnetic wave or charged particles, having an energy capable of polymerizing and cross linking a molecule. It is in general an electron beam (EB) or an ultraviolet ray (UV).

The above-mentioned pre-polymer or monomer is specifically a compound having a radically polymerizable unsaturated group such as a (meth)acryloyl group and a (meth)acryloyloxy group, a cation polymerizable functional group such as an epoxy group, or the like in a molecule. These pre-polymers, monomers can be used alone or as a mixture of a plurality of kinds. Here, for example the "(meth)acryloyl group" denotes an acryloyl group or a methcryloyl group. Moreover, as the ionizing radiation curing resin, a polyene/thiol based pre-polymer as a combination of a polyene and a polythiol can also be used preferably.

As to an example of the pre-polymer having a radically polymerizable unsaturated group in a molecule, a polyester (meth)acrylate, an urethane(meth)acrylate, an epoxy(meth)acrylate, a melamine(meth)acrylate, a triadine(meth)acrylate, or the like can be presented. As to the molecular weight, in general, those having about 250 to 100,000 can be used. The "(meth)acrylate" denotes an acrylate or a methacrylate.

As to an example of the monomer having a radically polymerizable unsaturated group in a molecule; a methyl(meth)acrylate, a 2-ethyl hexyl(meth)acrylate, a phenoxy ethyl (meth)acrylate, or the like can be presented as the monofunctional monomer. As the multifunctional monomer, a diethylene glycol di(meth)acrylate, a propylene glycol di(meth)acrylate, a trimethylol propane tri(meth)acrylate, a trimethylol propane tetra(meth)acrylate, a dipentaerythritol tetra(meth)acrylate, a dipentaerythritol penta(meth)acrylate, a dipentaerythritol hexa(meth)acrylate, or the like can be presented.

Examples of the pre-polymer having a cation polymerizable functional group in a molecule include pre-polymers of an epoxy based resin such as a bisphenol type epoxy resin and a novolak type epoxy compound, and a vinyl ether based resin such as a fatty acid based vinyl ether and an aromatic group based vinyl ether. As the thiol, a polythiol such as a trimethylol propane trithioglycolate, and a pentaarythritol tetrathioglycolate can be presented. Moreover, as the polyene, a polyurethane made of a diol and a diisocyanate with an allyl alcohol added on the both ends, or the like can be presented.

In the present invention, it is an object to block the uncured material of the thermosetting resin in the halfway of curing to be oozed out from the base material layer or the impregnated paper layer at the time of the heat pressing shaping. As a preferable means for solving the problem, in addition to the blocking layer formation, furthermore, a resin containing an alkylene oxide modified polymerizable compound is used for the ionizing radiation curing resin of the surface resin layer. By the use of the ionizing radiation curing resin containing the alkylene oxide modified polymerizable compound for the surface resin layer, compared with the case otherwise, since the alkylene oxide portion of the compound is hydrophilic, the affinity of the surface resin layer itself with respect to the thermosetting resin uncured material can be lowered. As a result, permeation of the uncured material of the thermosetting resin such as a melamine resin pre-polymer reaching to the surface resin layer can be restrained so that the ooze out of the thermosetting resin to the decorative material surface can be blocked by the surface resin layer itself. Then, since the surface resin layer is made of the ionizing radiation curing resin containing the alkylene oxide modified polymerizable compound, the function of the blocking layer present between the surface resin layer and the impregnated paper layer can be reinforced so that the thermosetting resin ooze out blocking effect can be provided further preferably.

The above-mentioned alkylene oxide modified polymerizable compound is a compound further having an alkylene oxide modified portion in a molecule of a compound capable of being polymerized by the various kinds of the ionizing radiations mentioned above. As a specific example of such an alkylene oxide modified polymerizable compound, one can be used optionally according to the application. As the alkylene oxide, a methylene oxide, an ethylene oxide, a propylene oxide, a butylene oxide, or the like can be used. For the reason to be described later, in particular, an ethylene oxide can be used optimally in the present invention. Hereinafter, the ethylene oxide will be described mainly.

As a specific example of the ethylene oxide modified polymerizable compound, for example, a trimethylol propane ethylene oxide modified tri(meth)acrylate, a bisphenol A ethylene oxide modified di(meth) acrylate, or the like can be presented. Then, with the chain number n (number per one molecule) of the ethylene oxide repeated unit in the ethylene oxide modified portion increased, the hydrophilic property is increased, and therefor the thermosetting resin uncured material blocking property is improved. On the other hand, due to the hydrophilic property increase, the water resistance and the pollution resistance with respect to the water based pollutant such as the water based ink of the surface resin layer are lowered. Therefore, the n number can be adjusted optionally. For example, n is 2 to 20, and it is more preferably 4 to 15. The ethylene oxide modified polymerizable compound may be a compound of bifunctional, trifunctional, or another functional number, such as tetrafunctional or more. These can be determined optionally in consideration to the required physical properties as the surface resin layer.

As the ionizing radiation curing resin used for the surface resin layer 2, the total amount of the resin component to be polymerized by the ionizing radiation may be provided as an ethylene oxide modified polymerizable compound; however, in terms of the physical properties other than the thermosetting resin uncured material blocking property, such as the pollution resistance with respect to the water based ink, or the like of the surface, another polymerizable compound capable of being polymerized by the ionizing radiation can be used optionally in a combination. Specifically, with only the ethylene oxide modified polymerizable compound, although the thermosetting resin uncured material blocking property can be improved for the hydrophilic property increase of the surface resin layer, the pollution resistance with respect to the water based pollutant such as the water based ink may be lowered due to the affinity increase with respect to the water based substance. In such a case, a non hydrophilic polymerizable compound such as an ethylene oxide non modified acrylate monomer (ordinary acrylate monomer) may be included. In the case of achieving both the thermosetting resin uncured material blocking property and the pollution resistance with respect to the water based pollutant, the composition ratio is preferably in a range of (ethylene oxide modified polymerizable compound)/(ethylene oxide non modified acrylate monomer)=3/7 to 5/5 (mass ratio).

Although the propylene oxide is an alkylene oxide compound similar to the ethylene oxide, if the propylene oxide modified compound is used instead of the ethylene oxide modified compound, due to the relative ratio reduction of the ether bond, the hydrophilic property increase tendency is small so that it is not as good as the case of the ethylene oxide modified compound in terms of the thermosetting resin uncured material blocking property. As the usable ionizing radiation curing resin other than the ethylene oxide modified compound, the above-mentioned compounds can be presented, and they can be used optionally.

In the case of cross linking the ionizing radiation curing resin by an ultraviolet ray, a photo polymerization initiating agent is added to the ionizing radiation curing resin. In the case of a resin based one having a radically polymerizable unsaturated group, as the photo polymerization initiating agent, acetophenones, benzophenones, thioxantones, a benzoin, benzoin methyl ethers can be used alone or as a mixture. Moreover, in the case of a resin based one having a cation polymerizable functional group, as the photo polymerization initiating agent, an aromatic diazonium salt, an aromatic sulfonium salt, an aromatic iodonium salt, a metallocene compound, a benzoin ester sulfonate, or the like can be used alone or as a mixture. The addition amount of these photo polymerization initiating agents is 0.1 to 10 parts by mass with respect to 100 parts by mass of the ionizing radiation curing resin.

To the above-mentioned ionizing radiation curing resin, various kinds of additives may be added as needed. As the additives, for example, thermoplastic resins such as a vinyl chloride-vinyl acetate copolymer, a vinyl acetate resin, an acrylic resin and a cellulose based resin, extenders (filling agents) comprising fine particles of a calcium carbonate, a barium sulfate, and wear reducing agent to be described later, lubricants such as a silicone resin and a wax, and coloring agents such as a dye and a pigment, or the like can be presented.

The wear reducing agent is to be added as needed in the case of further improving the wear resistance. As the wear reducing agent, hard inorganic particles (harder than the cross linked coating film of the ionizing radiation curing resin) can be used. As the material for the inorganic particles, a kaolinite, an almina ($\alpha$-alumina, or the like), an alminosilicate, a silica, a glass, a silicon carbonate, a boron nitride, a diamond, a cerium oxide, or the like can be presented. The shape of the inorganic particles can be spherical, ellipsoidal, polygonal (cubic, regular octahedron, another polygonal, or the like), scale-like, amorphous, or the like. The average particle size of the inorganic particles is preferably about 3 to 30 μm. In the case the average particle size is too small, the wear resistance improving effect is lowered; while, if it is too large, the surface smoothness is lowered. The addition amount of the inorganic particles is 5 to 30 parts by mass with respect to the resin component total amount.

As to the electron beam source for the ionizing radiation, those for directing electrons having an energy of 70 to 1,000 keV, preferably 80 to 300 keV, using various kinds of electron beam accelerators of the Cockcroft-Walton type, the handicraft type, the resonance transformer type, the insulating core transformer type, or the linear type, the dynamitron type, the high frequency type, or the like can be used. Moreover, as to the ultraviolet ray source, light sources such as the ultra high pressure mercury lamp, the high pressure mercury lamp, the low pressure mercury lamp, the carbon arc lamp, the black light, and the metal halide lamp can be used. As to the ultraviolet ray wavelength, in general, a wavelength range of 190 to 380 nm can be used mainly.

The blocking layer 3 has an embodiment of the impregnated blocking layer 3a impregnated in an inner part of the surface side of the paper comprising the impregnating paper layer 1 as shown in FIGS. 2 and 4, an embodiment of the independent blocking layer 3b present on the surface side of the impregnated paper layer 1 without being impregnated in the impregnating paper layer as shown in FIG. 3, and an embodiment having both the impregnated blocking layer 3a and the independent blocking layer 3b as shown in FIG. 5 (both the impregnating blocking layer and the independent blocking layer may be referred to also simply as the "blocking layer" as the general term).

The blocking layer 3 is present between the surface resin layer 2 and the impregnated paper layer 1 and it is made of a resin having the performance of blocking the permeation of the thermosetting resin uncured material (pre-polymer, monomer, or the like). The function realizing mechanism of the blocking layer 3 is considered to be the composite effect of the following two mechanisms. That is, one is that the blocking layer itself prevents the transmission of the thermosetting resin uncured material from the inside of the impregnated paper layer toward the surface resin layer at the time of the heat pressing. The other one is that owing to the presence of the blocking layer, in the duration from coating the surface resin layer to curing the same, the surface resin layer permeates unevenly into the paper so as to prevent formation of the pin holes and becoming porous, and thereby forming the surface resin layer densely. As a result, permeation of the thermosetting resin uncured material into the defect parts of the surface resin layer can be prevented.

For preventing the ooze out of the thermosetting resin uncured material to the surface resin layer surface according to the mechanisms, the coating amount of the blocking layer (at the time of drying) is preferably about 1 to 20 g/m$^2$. If it is less than that, the blocking effect is insufficient, and it is unnecessary to coat by an amount more than that because its effect is saturated.

As the resin for providing the blocking layer 3, an urethane resin, an epoxy resin, a polyester resin, an acrylic resin, or the like can be used. In particular, an urethane resin is preferable. As the urethane resin, a two component curing type urethane resin, a one component curing type (moisture curing type) urethane resin, a thermoplastic urethane resin, or the like can be used.

The two component curing type urethane resin is an urethane resin using a polyol as the principal agent and an isocyanate as the cross linking agent (curing agent). The polyol is the one having two or more hydroxyl groups in a molecule. For example, a polyethylene glycol, a polypropylene glycol, an acrylic polyol, a polyester polyol, a polyether polyol, a polycarbonate polyol, a polyurethane polyol, or the like can be used. Moreover, as the isocyanate, a polyvaleic isocyanate having two or more isocyanate groups in a molecule can be used. For example, aromatic isocyanates such as a, 2,4-trilene diisocyanate, a xylene isocyanate and a 4,4'-diphenyl methane diisocyanate, or aliphatic (or alicyclic) isocyanates such as a 1,6-hexamethylene diisocyanate, an isophorone diisocyanate, a hydrogenated trilene diisocyanate and a hydrogenated diphenyl methane diisocyanate can be used. Alternatively, adduction or a polymer of the above-mentioned various isocyanates can be used as well. For example, adduction of a trilene diisocyanate, a trimer of a trilene diisocyanate, or the like can be presented. In the above-mentioned isocyanates, an aliphatic (or alicyclic) isocyanate is preferable for its preferable weather resistance and heat yellowing resistance. Specifically, for example, a hexamethylene diisocyanate can be presented.

On the other hand, the one component curing type urethane resin is a composition with a pre-polymer having an isocyanate group on the molecule end as the essential component. The above-mentioned pre-polymer is in general a pre-polymer having one or more isocyanate groups each on the molecule both ends. Specifically, it is a polyisocyanate pre-polymer having a polycarbonate skeleton, a polyurethane skeleton, a polybutadiene skeleton, a polyester skeleton, or the like as the skeleton. The isocyanate groups are reacted with each other by the water content in the air so as to generate the chain extending reaction. As a result, a reaction product having a urea bond in a molecular chain is generated. Further by the reaction of the isocyanate groups on the molecular ends with the urea bond, a biuret-bond is generated so as to be branched and generate the cross linking reaction.

In the urethane resins, the two component curing type urethane resin is preferable in terms of the blocking property. In particular, those comprising a saturated acrylic polyol (not including an unsaturated bond in a molecule) and a 1,6-hexamethylene diisocyanate are particularly preferable. For improving the blocking property, a higher cross linking density is preferable.

Moreover, as the above-mentioned acrylic resin, acrylic resins such as a polymethyl(meth)acrylate, a polyethyl(meth)acrylate, a polybutyl(meth)acrylate, a methyl(meth)acrylate-butyl(meth)acrylate copolymer, a methyl(meth)acrylate-styrene copolymer, a methyl(meth)acrylate-butyl(meth)acrylate-(meth)acrylic acid-2-hydroxy ethyl copolymer and a methyl(meth)acrylate-butyl(meth)acrylate-(meth)acrylic acid-2-hydroxy ethyl-styrene copolymer can be presented (here, (meth)acrylic denotes acrylic or methacrylic).

The impregnated paper layer 1 is produced by impregnating a paper with a thermosetting resin and curing. As the paper, a thin paper, a titanium paper, a linter paper, a high-quality paper, a craft paper, a Japanese paper, or the like can be presented, and a paper with a metric grammage of about 20 to 100 g/m$^2$ can be used.

As to the timing for impregnating the paper with the thermosetting resin uncured material, (1) an embodiment of firstly impregnating the paper with the thermosetting resin uncured material liquid, thereafter forming the blocking layer, the pattern ink layer and the surface resin layer, and placing the surface layer S in this state onto the surface of the base material layer B for heat pressing; (2) an embodiment of firstly forming the blocking layer, the pattern ink layer and the surface resin layer onto the surface of the paper not impregnated, thereafter, impregnating the rear side of the paper with the thermosetting resin uncured material liquid, and placing the surface layer S in this state onto the surface of the base material layer B for heat pressing; and (3) an embodiment of firstly forming the blocking layer, the pattern ink layer, and the surface resin layer on the surface of the paper not impregnated, and thereafter placing the surface layer S on the surface of the base material layer B in a state without impregnating the paper for heat pressing so that the thermosetting resin uncured material permeates from the inside of the base material to the paper not impregnated during the heat pressing operation for carrying out the impregnation. In either case, the timing for curing the thermosetting resin uncured material impregnating the paper is at the heat pressing shaping stage.

As the impregnating resin, a thermosetting resin such as a melamine resin, a diallyl phthalate resin, an epoxy resin, a guanamine resin and an unsaturated polyester resin can be used. It may either be same as or different from the thermosetting resin in the base material layer B. It is preferable to use the same one in terms of the adhesion property between the base material layer B and the surface layer S. Then, as the impregnating resin, a liquid composition made of a pre-polymer (or an oligomer) in the uncured state, a monomer or a mixture thereof is as needed diluted with a solvent for impregnating a paper.

The pattern ink layer 4 is a layer for expressing a pattern, or the like. It is provided in general, however, it may be omitted in the case it is not necessary. Moreover, in the case the pattern ink layer is provided, the method for forming the pattern ink layer, the contents of the pattern ink layer such as the material and the pattern are not particularly limited. The pattern ink layer is formed in general using an ink by a conventionally known printing method such as gravure printing, silk screen printing, offset printing, gravure offset printing and ink jet printing. The pattern can be for example, a woody pattern, a graining pattern, a sand pattern, a blanket texture pattern, a tile like pattern, a brick like pattern, a leather pattern, a character, a mark, a geographic pattern, a combination of two or more kinds thereof, or the like.

The ink used for formation of the pattern ink layer 4 is made of a vehicle comprising a binder or the like, a coloring agent such as a pigment and a dye, and various kinds of additives to be added optionally thereto, such as an extender, a stabilizing agent, a plasticizing agent, a catalyst and a curing agent. The binder resin may be selected optionally out of a thermoplastic resin, a thermosetting resin, an ionizing radiation curing resin, or the like according to the required physical properties, printing suitability, or the like. For example, cellulose based resins such as a nitro cellulose, a cellulose acetate, and a cellulose acetate propionate, acrylic resins such as a polymethyl(meth)acrylate, a polybutyl(meth)acrylate, and a methyl(meth)acrylate-butyl(meth)acrylate-(meth) acrylic acid 2 hydroxy ethyl copolymer, an urethane resin, a vinyl chloride-vinyl acetate copolymer, a polyester resin, an alkyd resin, or the like can be used alone or as a mixture containing the same for the binder resin. Moreover, as the coloring agent, inorganic pigments such as a titanium white, a carbon black, an iron black, an -iron oxide red, a yellow lead and an ultramarine, organic pigments such as an aniline black, a quinacridone red, an isoindolinone yellow and a phthalocyanine blue, bright pigments such as foils of a titanium dioxide covered mica, an aluminum, or the like, or other dyes, or the like can be used.

The base material layer B comprises a paper with at least the uppermost layer impregnated with a thermosetting resin and cured. As needed, a layer of various kinds of materials such as a wood, a metal and an inorganic ceramic based material may be laminated onto the rear side. As the paper, those used as the base material for an ordinary thermosetting resin decorative plate such as a craft paper and a titanium paper of about a 50 to 200 g/m$^2$ metric grammage can be used in a state superimposed by about 1 to 10 pieces. For ensuring the blocking property and for preventing reflection of the color tone of the base material layer to the color tone of the surface layer, it is preferable to use a titanium paper with a titanium white pigment mixed for at least the uppermost surface paper.

The decorative material of the present invention can be attached on various kinds of base materials to be adhered and used as a decorative sheet. Specifically, the decorative material is attached onto the substrate to be adhered via an adhesive layer. The base material to be adhered is not particularly limited, and it is for example those of inorganic nonmetal based, metal based, wood based, plastic based, or the like.

Specifically, as the inorganic non metal based ones, for example, there are inorganic materials such as non pottery ceramic based materials including a plowed cement, an extruded cement, a slug cement, an ALC (light weight bubble concrete), a GRC (glass fiber reinforced cement), a pulp cement, a wood piece cement, an asbestos cement, a calcium silicate, a gypsum and a gypsum slug, and ceramics including a earthenware vessel, a pottery, a porcelain, a stoneware, a glass, an enamel, a china, a baked tile and a plate made of volcanic ash as the main material, or the like.

Moreover, as the metal based ones, for example those made of an iron, an aluminum, a copper, a stainless steel, or the like can be used. Moreover, those with these metals applied by plating, or the like can be used as well.

Moreover, as the wood based ones, a veneer of various kinds of materials such as cedar, cypress, Japanese zelkova, pine, lauan, teak and melapie, woody materials such as a wood single plate, a wood plywood, a particle board and a middle density fiber plate (MDF), or the like can be presented. These can be used alone or in a state laminated with each other. The wood based plates are not limited to the woody plates, but also include a plastic plate including paper powders and papers having a reinforced strength.

Moreover, the plastic based ones may have a physical or chemical surface process on one side or both sides by the oxidizing method or the convexoconcave method or the like as needed for improving the adhesion property with respect to the decorative material. As the above-mentioned oxidizing method, for example, the corona discharge process, the chromic acid process, the flame process, the hot air process, the ozone-ultraviolet ray process method, or the like can be presented. As the convexoconcave method, for example, the sandblast method, the solvent process method, or the like can be presented. These surface processes can be selected optionally according to the kind of the base material. In general, the corona discharge process method can be used preferably in terms of the effect, the operation property and so on. As such plastic based base materials, those made of various kinds of synthetic resins can be presented. As the synthetic resin, an ABS resin, a phenol resin, a polyethylene resin, a polypropylene resin, a polymethyl pentene resin, a polyvinyl chloride resin, a polyvinylidene chloride resin, a polyvinyl alcohol resin, a vinyl chloride-vinyl acetate copolymer resin, an ethylene-vinyl acetate copolymer resin, an ethylene-vinyl alcohol copolymer resin, a polyethylene terephthalate resin, a polybutylene terephthalate resin, a polyethylene naphthalate-isophthalate copolymer resin, a methyl polymethacrylate resin, an ethyl polymethacrylate resin, a butyl polyacrylate resin, a polyamide resin represented by a nylon 6, a nylon 66, or the like, a cellulose triacetate, a cellophane, a polystyrene resin, a polycarbonate resin, a polyallylate resin, or a polyamide resin, or the like can be presented. The shape of the base material to be adhered can be selected optionally such as flat plate, curved plate and polygonal prism.

Moreover, in addition thereto, a composite material of various kinds of materials such as a plate of a fiber reinforced plastic (FRP), a paper honeycomb with an iron plate attached on the both sides, two aluminum plates with an polyethylene resin interposed, or the like can be used as the base material as well.

Moreover, the substrate may have a process of forming a primer layer, or the like; coating for adjusting the color; or a pattern in terms of the design may be formed preliminarily. As the substrate to be an adherend, a plate material, such as a flat plate and a curved plate of various kinds of materials, or a three-dimensional shape article (shaped product) of a single member or a composite body of the above-mentioned materials can be the subject.

The decorative material may be used in a state with a backing material such as a Japanese paper, a machine made paper, a synthetic paper, a non woven fabric, a woven fabric, a butter muslin, an impregnated paper, a synthetic resin sheet, or the like attached. By attaching the backing material, the functions of reinforcing the decorative material itself, preventing cracking or breaking of the decorative material, preventing ooze out of the adhesive to the decorative material surface, or the like can be achieved so as to prevent generation of defect goods as well as facilitate handling so that the productivity can be improved.

By pressing and clamping the substrate with the decorative material placed via an adhesive for each leaf or continuously using an attaching device such as a cold press, a hot press, a roll press, a laminator, a wrapping, a rim attaching machine and a vacuum press, the decorative material is bonded onto the substrate surface so as to provide a decorative sheet.

The adhesive is coated using a coating device such as a spray, a spreader, and a bar coater. As the adhesive, adhesives of the vinyl acetate based, the urea resin based, the melamine resin based, the phenol resin based, the isocyanate based, or the like can be used alone or optionally mixed as a mixed type adhesive. To the adhesive, as needed, inorganic powders of a talc, a calcium carbonate, a clay, a titanium white, or the like, flour, wood powders, plastic powders, a coloring agent, an insect repellent, an anti mold agent, or the like can be added and mixed. In general, the adhesive has the solid component of 35 to 80% by mass, and it is coated onto the substrate surface in a range of the 50 to 300 g/m² coating amount.

The decorative material is attached onto the substrate in general by the methods of forming the adhesive layer on the rear surface of the decorative material of the present invention and attaching the substrate, or coating the adhesive on the substrate and attaching the decorative material, or the like.

The decorative sheet produced as mentioned above may also have the optional decoration by optionally cutting the decorative sheet, and using the cutting process machine such as the router and the cutter to the surface or the cut end part for the groove process, the chamfer process, or the like. Then, it can be used for various applications, for example the interior or exterior materials for a building such as the wall, the ceiling and the floor, the surface decorative sheet for fittings such as a window frame, a door, a door frame, a handrail, a base board, a round rim and a maul, the surface material for the fixture members such as the round rim and the baseboard, the surface decorative sheet for the furniture such as a kitchen, a chest and a cabinet or a cabinet for the light electrical or OA appliance, the interior or exterior for the automobiles, or the like.

EXAMPLES

Example 1

In the example 1, a decorative material as shown in FIG. 3 was produced. First, a pattern ink layer 4 was formed on a paper layer comprising an ordinary paper for a building material of a 30 g/m² grammage. That is, a pattern ink layer 4 of a woody pattern was formed by forming an entire solid layer by gravure printing using an ink prepared by adding a pigment containing a titanium white, an iron oxide red and a yellow lead to a soluble nitrocellulose and an acrylic resin as the binder resin; and gravure printing using an ink prepared by adding a pigment containing an iron oxide red, a yellow lead and an Indian ink to an acrylic resin as the binder resin.

Then, an independent blocking layer 3b of a 3 g/m² thickness was formed on the pattern ink layer 4 by gravure printing with a two component curing type urethane resin made from 100 parts by mass of a saturated acrylic polyol and 8 parts by mass of a 1,6 hexamethylene diisocyanate. Furthermore, a surface resin layer 2 was formed thereon. That is, after applying an electron beam curing type resin coating solution of the below-mentioned composition, containing a trimethylol propane EO (ethylene oxide) modified triacrylate (chain number of the ethylene oxide n=9) which is the acrylate based trifunctinoal monomer as the ethylene oxide modified polymerizable compound with the gravure offset method by a 4 g/m² thickness (based on the solid component), an electron beam of a 175 kV acceleration voltage was directed by 5 Mrad so as to cross link and cure the coating film of the surface resin layer. Thereafter, by cross linking and curing also the independent blocking layer 3b by curing, the surface layer S (however, the paper layer in this stage was not impregnated) was obtained.

| Composition of the electron beam curing type resin coating solution: (ethylene oxide modified monomer:ethylene oxide non modified monomer = 40:60) | |
|---|---|
| Trimethylol propane EO modified triacrylate (n = 9) | 40 parts by mass |
| Trimethylol propane triacrylate | 55 parts by mass |
| Ditrimethylol propane tetraacrylate | 5 parts by mass |
| Baked kaolin particles (average particle size: 1.5 μm) | 10 parts by mass |
| Silica particles (average particle size: 0.005 μm) | 0.5 part by mass |
| Silicone methacrylate | 1.5 parts by mass |

Then, as the raw material for the base material layer B, one with a titanium paper (containing 30 parts by weight of a titanium white) impregnated with a melamine resin uncured material placed on the surface of 5 pieces of craft paper impregnated with a phenol resin uncured material was prepared. Then, with the surface layer S placed on the placed substance such that the paper layer faces to the titanium paper side, heat pressing was carried out by the 130° C., 100 kg/cm², 10 minutes condition. Thereby, the impregnated phenol resin and melamine resin were cured for forming the base material layer B as well as the melamine resin in the titanium paper impregnated into the paper layer so as to be cured for providing the impregnated paper layer 1, and the decorative material was obtained by integrating the surface layer S and the base material layer B.

Example 2

A decorative material was produced in the same manner as in the example 1 except that a trimethylol propane EO modified triacrylate having the n number of 4 (n=4) was used instead of the trimethylol propane EO modified triacrylate (n=9) in the electron beam curing type resin coating solution used for the formation of the surface resin layer 2 in the example 1.

Example 3

A decorative material was produced in the same manner as in the example 1 except that a trimethylol propane EO modified triacrylate having the n number of 2 (n=2) was used instead of the trimethylol propane EO modified triacrylate (n=9) in the electron beam curing type resin coating solution used for the formation of the surface resin layer 2 in the example 1.

Example 4

A decorative material was produced in the same manner as in the example 1 except that a trimethylol propane EO modified triacrylate having the n number of 23 (n=23) was used instead of the trimethylol propane EO modified triacrylate (n=9) in the electron beam curing type resin coating solution used for the formation of the surface resin layer 2 in the example 1.

Example 5

A decorative material was produced in the same manner as in the example 1 except that a propylene oxide modified monomer (trimethylol propane propylene oxide modified triacrylate) was used instead of the trimethylol propane EO modified triacrylate (n=9) in the electron beam curing type resin coating solution used for the formation of the surface resin layer 2 in the example 1.

Example 6

A decorative material was produced in the same manner as in the example 1 except that an epoxy acrylate based prepolymer was used instead of the trimethylol propane EO modified triacrylate (n=9) in the electron beam curing type resin coating solution used for the formation of the surface resin layer 2 in the example 1.

Example 7

A decorative material was produced in the same manner as in the example 1 except that a polyester acrylate based prepolymer was used instead of the trimethylol propane EO modified triacrylate (n=9) in the electron beam curing type resin coating solution used for the formation of the surface resin layer 2 in the example 1.

Example 8

A decorative material was produced in the same manner as in the example 1 except that an urethane acrylate based prepolymer was used instead of the trimethylol propane EO modified triacrylate (n=9) in the electron beam curing type resin coating solution used for the formation of the surface resin layer 2 in the example 1.

Example 9

A decorative material was produced in the same manner as in the example 1 except that a polyester based monomer was used instead of the trimethylol propane EO modified triacrylate (n=9) in the electron beam curing type resin coating solution used for the formation of the surface resin layer 2 in the example 1.

Example 10

A decorative material was produced in the same manner as in the example 1 except that a HPPA monomer (2-hydroxy-3-phenoxy propyl acrylate) was used instead of the trimethylol propane EO modified triacrylate (n=9) in the electron beam curing type resin coating solution used for the formation of the surface resin layer 2 in the example 1.

Example 11

A decorative material was produced in the same manner as in the example 1 except that a modified alkyl acrylate monomer was used instead of the trimethylol propane EO modified triacrylate (n=9) in the electron beam curing type resin coating solution used for the formation of the surface resin layer 2 in the example 1.

Example 12

A decorative material was produced in the same manner as in the example 1 except that the composition ratio (mass ratio) of the ethylene oxide modified monomer made from the trimethylol propane EO modified triacrylate (n=9) and the tetrafunctional acrylate monomer was changed from 40:60 to 30:70 in the electron beam curing type resin coating solution used for the formation of the surface resin layer 2 in the example 1.

Example 13

A decorative material was produced in the same manner as in the example 1 except that the composition ratio (mass ratio) of the ethylene oxide modified monomer made from the trimethylol propane EO modified triacrylate (n=9) and the ethylene oxide non modified monomer made from the trimethylol propane triacrylate and the ditrimethylol propane tetraacrylate was changed from 40:60 to 50:50 in the electron beam curing type resin coating solution used for the formation of the surface resin layer 2 in the example 1.

Example 14

A decorative material was produced in the same manner as in the example 1 except that the composition ratio (mass ratio) of the ethylene oxide modified monomer and the ethylene oxide non modified monomer was changed from 40:60 to 20:80 in the electron beam curing type resin coating solution used for the formation of the surface resin layer 2 in the example 1.

Example 15

A decorative material was produced in the same manner as in the example 1 except that the composition ratio (mass ratio) of the ethylene oxide modified monomer and the ethylene oxide non modified monomer was changed from 40:60 to 60:40 in the electron beam curing type resin coating solution used for the formation of the surface resin layer 2 in the example 1.

Example 16

A decorative material was produced in the same manner as in the example 1 except that the composition ratio (mass ratio) of the ethylene oxide modified monomer and the ethylene oxide non modified monomer was changed from 40:60 to 70:30 in the electron beam curing type resin coating solution used for the formation of the surface resin layer 2 in the example 1.

Example 17

A decorative material was produced in the same manner as in the example 1 except that the composition ratio (mass ratio) of the ethylene oxide modified monomer and the ethylene oxide non modified monomer was changed from 40:60 to 80:20 in the electron beam curing type resin coating solution used for the formation of the surface resin layer 2 in the example 1.

Example 18

A decorative material as shown in FIG. 4 was produced in the same manner as in the example 1 except that firstly the resin composition same as the independent blocking layer of the example 1 was coated on the surface of the paper layer (3 g/m$^2$) prior to the formation of the pattern ink layer so as to impregnate the vicinity of the paper layer surface for forming the impregnated blocking layer, and thereafter an entire solid layer as the pattern ink layer was formed by gravure printing with an ink prepared by adding a titanium oxide as the coloring agent to a two component curing type urethane resin made from an acrylic polyol and an isocyanate.

Example 19

Woody decorative sheets were produced by bonding the rear surface of the decorative materials produced in the examples 1 to 18 and a 18 mm thickness particle board as the substrate to be adhered via an adhesive formed on the wood particle board by coating by 60 g/m$^2$ (wet) condition with a urea based adhesive produced by OSHIKA CORPORATION (LS-12A). As a result, in the all cases of using any decorative material, a preferable bonding property was confirmed.

For evaluating the decorative materials obtained in the examples 1 to 18, a decorative material to be the comparative example was obtained in the same manner as in the example 1 except that the formation of the independent blocking layer in the example 1 was omitted. The evaluation results of the examples 1 to 18 and the comparative example are as shown in the tables 1 and 2.

The ooze out blocking property of the thermosetting resin to the decorative material surface was evaluated by the visual observation. Since the ooze out changes the surface glossiness and the external appearance, those without the ooze out based on the external appearance change were judged to be preferable (○), those with the slight ooze out to be slightly preferable (Δ) and those apparently with the ooze out to be poor (X).

The pollution resistance property was evaluated based on the water resistance and oil resistance indexes. For those with the preferable ooze out blocking property, whether or not the pollution resistance with respect to the water based pollutant was deteriorated due to the water resistance decline was confirmed. Specifically, a water based blue ink was dropped onto the coated paper surface so as to be left for 24 hours, and it was wiped off with a gauze soaked with an alcohol for evaluating the pollution of the water based blue ink by the visual observation. Moreover, as to the oil resistance, a salad oil was dropped onto the coated paper surface so as to be left for 24 hours, and it was wiped off with a gauze soaked with an alcohol for evaluating the wet color of the oil permeation by the visual observation. Both for the water resistance and the oil resistance, those without the pollution were judged to be preferable (○), those with the slight pollution to be slightly preferable (Δ) and those apparently with the pollution to be poor (X).

TABLE 1

|  | Polymerizable compound | Blocking layer Independent | Blocking layer Impregnated | Blocking property | Pollution resistance Water resistance | Pollution resistance Oil resistance |
|---|---|---|---|---|---|---|
| Example 1 | Ethylene oxide modified monomer(n = 9) | Present | Absent | ○ | ○ | ○ |
| Example 2 | Ethylene oxide modified monomer(n = 4) | Present | Absent | ○ | ○ | ○ |
| Example 3 | Ethylene oxide modified monomer(n = 2) | Present | Absent | Δ | ○ | Δ |
| Example 4 | Ethylene oxide modified monomer(n = 23) | Present | Absent | Δ | X | ○ |
| Example 5 | Propylene oxide modified monomer | Present | Absent | Δ | Δ | Δ |
| Example 6 | Epoxy acrylate based pre-polymer | Present | Absent | Δ | Δ | Δ |
| Example 7 | Polyester acrylate based pre-polymer | Present | Absent | Δ | Δ | Δ |
| Example 8 | Urethane acrylate based pre-polymer | Present | Absent | Δ | Δ | Δ |
| Example 9 | Polyester based monomer | Present | Absent | Δ | Δ | Δ |
| Example 10 | HPPA monomer | Present | Absent | Δ | Δ | Δ |
| Example 11 | Modified alkyl acrylate monomer | Present | Absent | Δ | Δ | Δ |
| Example 18 | Ethylene oxide modified monomer(n = 9) | Absent | Present | ○ | ○ | ○ |
| Comparative example | Ethylene oxide modified monomer(n = 9) | Absent | Absent | X | Δ | Δ |

As shown in the table 1, according to the examples 1 and 2, since the ionizing radiation curing resin of the surface resin layer contains the ethylene oxide modified polymerizable compound in addition to the blocking layer formation, the ooze out of the thermosetting resin to the decorative material surface could be blocking preferably; and furthermore, a preferable result was obtained also for the pollution resistance (water resistance) with respect to the water based pollutant and the oil resistance. However, among the ethylene oxide modified polymerizable compounds, if the chain number of the ethylene oxide was too small as n=2 (example 3), or on the contrary too large as n=23 (example 4), although the improving effect could be observed compared with the comparative example 1 without the blocking layer, the blocking property of the perfect level could not be obtained. Particularly in the case the n number was too large, due to the too much increase of the hydrophilic property, the water resistance was lowered so that the blocking property and the pollution resistance property could not be provided preferably at the same time.

Moreover, according to the examples 5 to 11 using another polymerizable compound instead of the ethylene oxide modified polymerizable compound, although the improving effect could be provided compared with the comparative example 1, the blocking property of the perfect level could not be obtained. For example, according to the example 5 using the propylene oxide modified polymerizable compound same in regard to the alkylene oxide modification, due to the low hydrophilic property degree, although the blocking property could be improved to some extent compared with the comparative example 1, it was at most slightly preferable. Also according to the examples 6 to 11 using another polymerizable compound, the blocking property was at most slightly preferable so that a preferable performance could not be obtained.

TABLE 2

| | Composition ratio (ethylene oxide modified monomer:tetrafunctional acrylate monomer) | Blocking layer | | Blocking property | Pollution resistance | |
|---|---|---|---|---|---|---|
| | | Independent | Impregnated | | Water resistance | Oil resistance |
| Example 1 | 40:60 | Present | Absent | ○ | ○ | ○ |
| Example 12 | 30:70 | Present | Absent | ○ | ○ | ○ |
| Example 13 | 50:50 | Present | Absent | ○ | ○ | ○ |
| Example 14 | 20:80 | Present | Absent | Δ | ○ | Δ |
| Example 15 | 60:40 | Present | Absent | ○ | X | ○ |
| Example 16 | 70:30 | Present | Absent | ○ | X | ○ |
| Example 17 | 80:20 | Present | Absent | ○ | X | ○ |

Moreover, as shown in the table 2, the blocking property was changed also by the composition ratio of the ethylene oxide modified polymerizable compound so that a result to have both the blocking property and the pollution resistance preferably in a range of the composition ratio (mass ratio) of the ethylene oxide modified monomer (trimethylol propane EO modified triacrylate (n=9)) tetrafunctional monomer of 30:70 to 50:50. With the small ratio of the ethylene oxide modified polymerizable compound of the above-mentioned composition ratio of 20:80, the blocking property was at most slightly preferable. On the other hand, with the large ratio of the ethylene oxide modified polymerizable compound of the above-mentioned composition ratio of 60:40, although the blocking property and the oil resistance were preferable, the water resistance was poor.

Moreover, according to the example 18 with the order of the blocking layer and the pattern ink layer changed with respect to the example 1, a result to have both the blocking property and the pollution resistance (water resistance, oil resistance) preferably could be obtained as in the example 1.

The invention claimed is:

1. A decorative material comprising a base material layer, and a surface layer directly formed on the base material layer,
    wherein the base material layer comprises a base material layer-side impregnated paper layer contacting to the surface layer, the base material layer-side impregnated paper layer being a part of a base material layer-paper impregnated with a thermosetting resin and cured;
    the surface layer comprises:
    a surface layer-side impregnated paper layer formed directly on an upper surface of the base material layer-side impregnated paper layer, the surface layer-side impregnated paper layer being a part of a surface layer-paper impregnated with a thermosetting resin and cured,
    a blocking layer formed to cover an entire upper surface of the surface layer-side impregnated paper layer and comprising a blocking resin which blocks permeation of the thermosetting resin, and
    a surface resin layer formed directly on an upper surface of the blocking layer and comprises a cured material of an ionizing radiation curing resin; and wherein the ionizing radiation curing resin comprises ethylene oxide modified polymerizable compound and ethylene oxide non modified acrylate monomer by mass ratio of 30:70 to 50:50; and a chain number n of an ethylene oxide repeated unit in an ethylene oxide modified portion of the ethylene oxide modified polymerizable compound is within the range of 2 to 20.

2. The decorative material according to claim 1, wherein a pattern ink layer is provided between the surface resin layer and the blocking layer.

3. The decorative material according to claim 2, wherein the blocking layer comprises a cured material of a two component curing type urethane resin.

4. The decorative material according to claim 1, wherein a pattern ink layer is provided between the blocking layer and the surface layer-side impregnated paper layer.

5. The decorative material according to claim 1, wherein the
    surface layer-side impregnated paper layer further comprises an impregnated blocking layer,
    the impregnated blocking layer is a part of the surface layer-paper containing the surface layer-side impregnated paper layer impregnated with a blocking resin.

6. The decorative material according to claim 5, wherein a pattern ink layer is provided either between the surface resin layer and the blocking layer, or between the blocking layer and the impregnated blocking layer.

7. The decorative material according to claim 1, wherein the blocking layer comprises a cured material of a two component curing type urethane resin.

8. A decorative sheet comprising the decorative material according to claim 1 and a substrate adhered to a bottom portion of the base material layer of the decorative material according to claim 1.

* * * * *